United States Patent [19]
Poetsch et al.

[11] 4,244,003
[45] Jan. 6, 1981

[54] CHARGE PROPORTIONAL OPTO-ELECTRONIC CONVERTER PROVIDING ENHANCED BLUE COLOR SIGNAL

[75] Inventors: Dieter Poetsch, Ober-Ramstadt; Dietmar Gornott, Darmstadt-Arheiligen, both of Fed. Rep. of Germany

[73] Assignee: Robert Bosch GmbH, Stuttgart, Fed. Rep. of Germany

[21] Appl. No.: 891,457

[22] Filed: Mar. 29, 1978

[30] Foreign Application Priority Data
Apr. 4, 1977 [DE] Fed. Rep. of Germany ....... 2715097

[51] Int. Cl.³ .................. H04N 9/09; H04N 9/11
[52] U.S. Cl. .................................. 358/50; 358/54
[58] Field of Search ............... 358/213, 54, 50, 52, 358/211, 43, 44, 48, 49; 250/211 J, 211 R; 357/24, 30

[56] References Cited
U.S. PATENT DOCUMENTS

| | | | |
|---|---|---|---|
| 3,919,468 | 11/1975 | Weimer | 358/213 |
| 4,007,488 | 2/1977 | Morishita et al. | 358/213 |

*Primary Examiner*—John C. Martin
*Attorney, Agent, or Firm*—Quaintance, Murphy & Richardson

[57] ABSTRACT

A color television imaging method is proposed, which serves both for the scanning of color films and for the taking of scenes with a color television camera. In this method, several primary color signals are formed with the use of at least two sets of opto-electronic converters wherein a charge proportional to the specific quantity of light is integrated within sequential scanning intervals and wherein the integration for the blue primary color signal is carried out over a greater time period and/or area.

16 Claims, 10 Drawing Figures

CHARGE PROPORTIONAL OPTO-ELECTRONIC CONVERTER PROVIDING ENHANCED BLUE COLOR SIGNAL

BACKGROUND OF THE INVENTION

1. Field of the Invention

The invention relates generally to a method for deriving color images from solid state image sensors wherein the blue primary color signal is enhanced. The invention particularly relates to color film scanners and cameras employing charge-coupled imaging devices.

2. Description of the Prior Art

The use of solid state image sensors, i.e. photodiodes arranged in lines or matrices, or corresponding charge-couple arrangements, for purposes of color television has so far failed because the sensitivity of these sensors is low in the blue spectral range. Therefore, color television cameras equipped with these sensors could, so far, only be used for experimental purposes with very high illumination intensities.

For the purpose of avoiding this disadvantage, it has already been proposed in German Patent Application No. P 2 644 574 to insert an image amplifier in the blue channel of a television camera which is equipped with solid state image sensors. However, this amplifier requires an additional high voltage supply on the one hand, and, on the other hand, a more expensive optical coupling in such a color television camera.

From the book by Sequin and Tompsett, "Charge Transfer Devices", Academic Press Inc., New York, 1975, especially page 185, the combination of adjacent light-sensitive elements for the purpose of improving the signal-to-noise ratio for applications with low illumination intensities is already known, but it is obtained at the expense of a deterioration of the resolution. However, this reference does not cite an application for color television. Apart from an increase in the size of the elements, there is also no indication given of the manner in which the light-sensitive elements should be combined.

It is intended that one embodiment of the present invention be considered as an improvement which can be used in connection with a color film scanner of the type described in German patent application No. P 2 632 378.

SUMMARY OF THE INVENTION

In the present invention, primary color signals are derived from at least two sets of solid state opto-electronic converters forming an image sensor. Each converter produces a charge which is proportional to the quantity of light incident thereon. The charges on a set of converters are integrated on sequential scanning intervals to obtain a color signal. The integration for the blue primary signal takes place over a greater time period and/or area than with the other color signals. In a preferred method an increased time integration is accomplished by suitably interrupting the reading timing pulse train of the image sensors provided for the blue primary color.

In an embodiment used for scanning color films which move continuously with respect to the solid state image sensors, a single row-shaped image sensor is provided for each primary color signal. The signals produced by the image sensors are scanned in a non-interlaced sequence, then stored and transformed to a standard television format corresponding to the particular television standards employed. A time integration of the blue primary color signal can be carried out over a time period which is greater than the normal line scanning period, the integrated signal being stored for use to develop two sequential line signals one being an interpolation with a subsequently developed signal.

Another embodiment uses image sensors which each comprise a matrix of opto-electronic converters, an intermediate storage area and a horizontal register. The integration is achieved by suppressing every second timing impulse group normally used in reading the light intensity information from the converters into the intermediate storage area. In addition to the suppression of every second timing pulse, the remaining pulses are replaced by two short sequence pulses. The resulting signal output can then be fed into the input of the horizontal register through a switch which is controlled with a half-line frequency.

It is also possible, by appropriate timing, to combine the charges of two or more adjacently located photocells so that an integration results both in the horizontal and the vertical direction which leads to an improvement of the sensitivity and of the signal-to-noise ratio. It is also possible to employ a common image sensor for both the red and blue primary color signals so long as the red primary color signal is damped by an appropriate filter.

Other further developments concern the application of the method in accordance with this invention in color television cameras with the use of so-called charge-coupled image sensors, which are also called "charge coupled imaging devices" (CCIDs). With these elements, the integration in accordance with this invention can be carried out by the appropriate timing of the charge shift, whereby it is even possible, for the purpose of completing the particular missing television lines, to use the horizontal register present in these elements.

In so far as the embodiment of the invention is carried out in such a manner that the integration is carried out over a larger area, there is a deterioration of the resolution of the blue primary color signal, but this is not disturbing in any way because of the encoding of the color value signals in accordance with known color television processes the band width of the blue signal is constrained considerably in any case.

Other features and advantages of the invention will become apparent upon considering the several embodiments of this invention illustrated in the FIGURES and exemplified in greater detail in the following description.

BRIEF DESCRIPTION OF THE DRAWINGS

FIG. 2b shows the pulse signal potential-time diagrams associated with the embodiment illustrated in FIG. 2a.

FIG. 3b shows a circuit arrangement with a solid state image sensor (CCID) which provides for the blue channel of a color television camera in accordance with FIG. 3a.

DESCRIPTION OF THE PREFERRED EMBODIMENTS

Figure 1A:
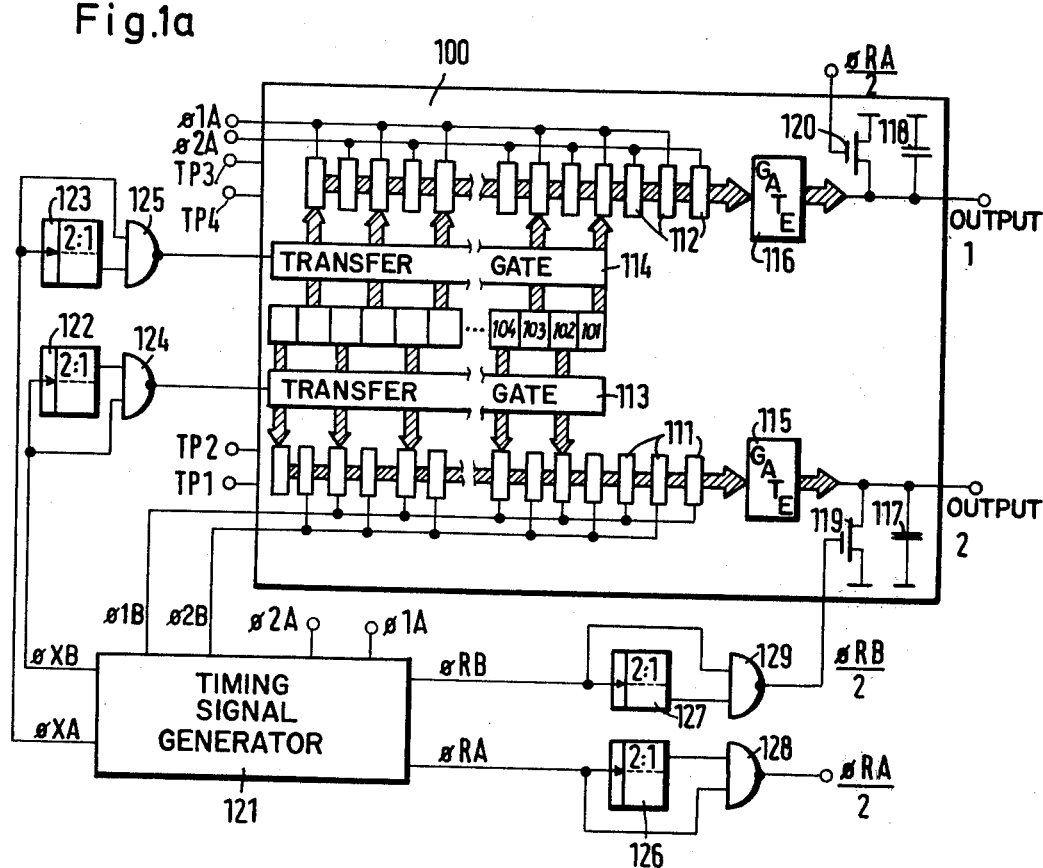
FIG. 1a schematically shows a circuit arrangement for the implementation of the method in accordance with this invention with a CCD line sensor.

A first embodiment of the invention has application in the scanning of color films where the film is moved continuously past a row-shaped CCID designated as 100 in FIG. 1a. An example of such a device may be purchased from Fairchild under the designation CCD131. The individual light-sensitive points are designated 101, 102 to 10n. The charge, which is produced in the individual points by the particular quantity of light, is transferred into a register with the known method at the end of each line period. In the case of the described CCID, the charges of the odd-numbered points 101, 103, . . . are transferred through a first gate 114 and the even-numbered points 102, 104 . . . through a second gate 113.

Figure 1B:
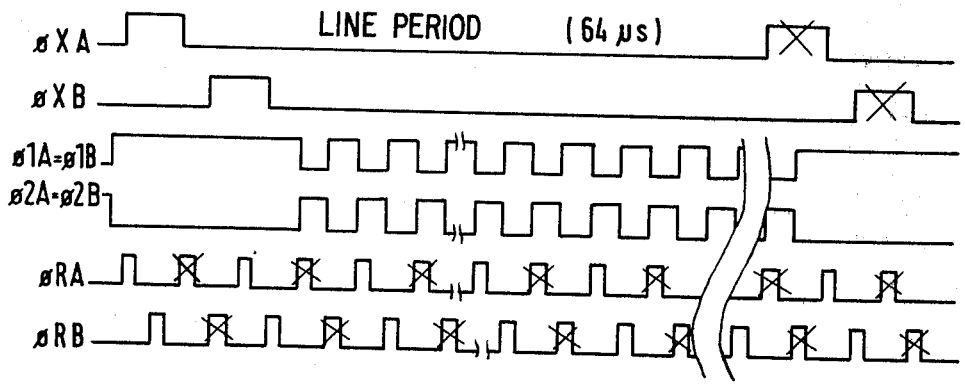
FIG. 1b shows the pulse signals occurring in the circuit arrangement in accordance with FIG. 1a in the form of potential-time diagrams.

The pulse signals serving for the control of the individual processes are generated in a timing signal generator 121. Thus, the transfer gates 114 and 113 are controlled with the pulse signals $\phi XA$ and $\phi XB$ (FIG. 1b). After the transfer, the individual charges, which correspond to the image points, are in registers 111 and 112, and they are then shifted, with oppositely timed pulse signals $\phi 1B$ and $\phi 2B$, and, $\phi 1A$ and $\phi 2A$ respectively, through the registers, through an output gate 115 and 116, to an output storage 117 and 118 respectively. Following each image point period, the output storages 117 and 118 are discharged by switches 119 and 120 respectively, these switches being controlled by pulse signals $\phi RA$ and $\phi RB$.

For the application of the invention, variously timed pulses are suppressed in the circuit which is described so far, as described in the following, so that longer integration periods and thus a greater charge per image point will result. In effect, prolonged integration is accomplished by combining charges over a prolonged period of time. Thus, in the application in accordance with this invention, it is possible to suppress every second of the impulses $\phi XA$ and $\phi XB$. The frequency dividers 122 and 123 are provided for this purpose. At the output of each of these frequency dividers, a square wave potential of half-line frequency develops, so that then, with the aid of the succeeding AND gates 124 and 125 every other pulse is suppressed, as schematically illustrated in FIG. 1b.

The prolonging of the integration period to double the period, which is thus described, effects, on the one hand an increase of the sensitivity by 6 dB and, on the other hand, a decrease of the vertical resolution to one half because the film, as mentioned above, is continually moved past the CCID 100 and moves twice the distance during the double integration time in comparison with the single integration period. However, this reduction in the resolution is not noticeably deleterious because of the systems characteristics of the conventional color television systems.

A further improvement of the sensitivity and of the signal-to-noise ratio results from the measure which is described in the following, which can be used both alone and in combination with the suppression of the timed pulse signals $\phi XA$ and $\phi XB$. In a manner similar to that previously discussed, the pulse signals fed to switches 119 and 120 for discharging the output storages 117 and 118 can be partially suppressed. For example, in order to suppress every second pulse of $\phi RA$ and $\phi RB$, the frequency dividers 126 and 127 are used in combination with the AND gates 128 and 129. This results in the combination of two adjacent image points and thus the charge corresponding to the particular brightness is integrated. While the horizontal resolution is reduced in this case, this is not disturbing for the above mentioned reasons. The suppression of each second of the impulses $\phi RA$ and $\phi RB$ is also schematically illustrated in FIG. 1b.

Without deviating from the scope of the invention, it is also possible to further improve the integration effect and thus the sensitivity and the signal-to-noise ratio by modifying the pulse signals $\phi XA$, $\phi XB$, $\phi RA$, and $\phi RB$ such that only each third or possibly even less pulses are used for the control of the CCIDs. The circuits consisting of the frequency dividers and the AND gates 122 to 129 would have to be changed accordingly in a manner well known to those skilled in the art.

Figure 2A:
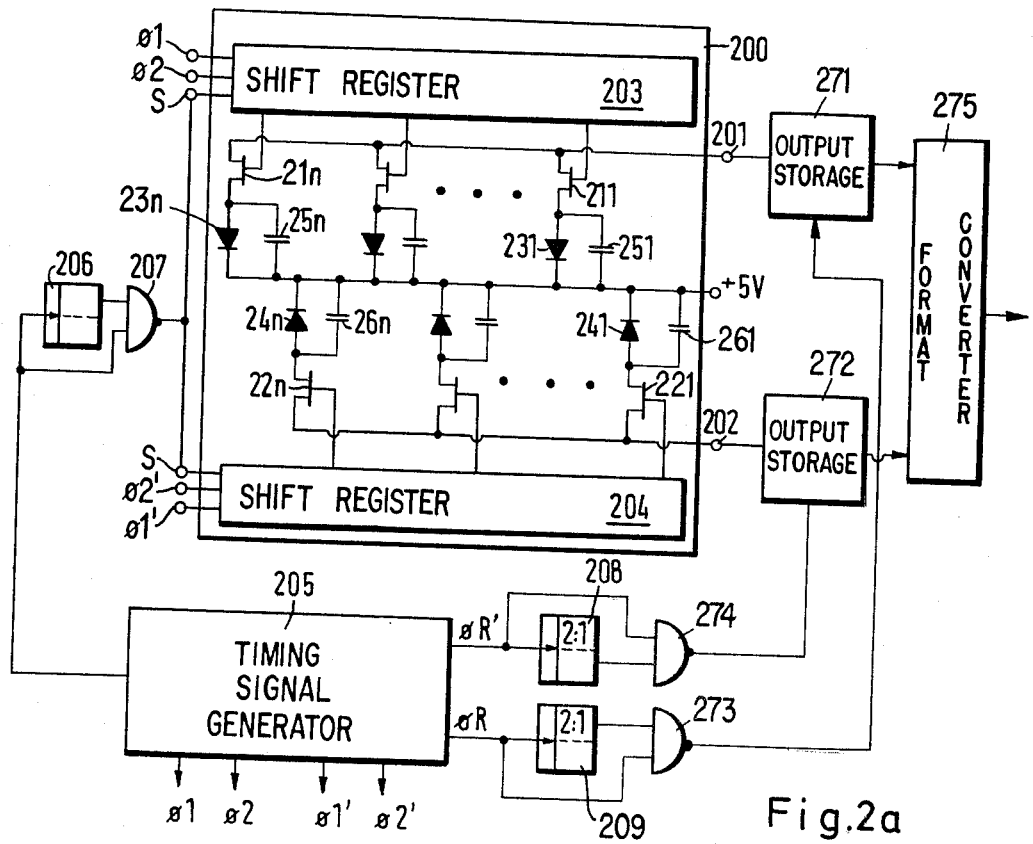
FIG. 2a shows an additional embodiment with a line of photodiodes.

In the embodiment illustrated in FIG. 2a, which is also directed to color film scanning, a photodiode line 200 is employed such as is available from Reticon. The individual light-sensitive elements consist of photodiodes 231 to 23n and 241 to 24n of which the capacities are illustrated in FIG. 2a as condensers 251 to 25n and 261 to 26n. The charge corresponding to the quantity of light received by each image point photodiode is sequentially transmitted to the outputs 201 and 202 for the odd-numbered and even-numbered image points with the aid of switches 211 to 21n and 221 to 22n, respectively. The switches 211 to 21n and 221 to 22n are controlled by shift registers 203 and 204. At the beginning of a line, a starting pulse S is fed to the latter, having the form shown in FIG. 2b and being generated in a timing signal generator 205 in a known manner. Similar to that already described in connection with FIG. 1, the starting pulse S is suppressed during every second line with the aid of a frequency divider 206 and an AND gate 207. In this manner, the discharge of the condensers 251 to 25n and 261 to 26n is suppressed during every second line, so that the integration period doubles, similar to the arrangement described in connection with FIG. 1.

Figure 2B:
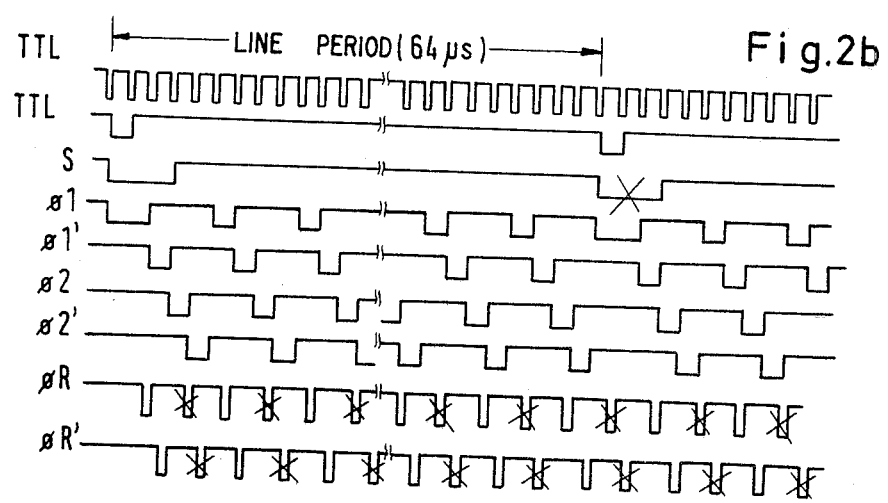

Timing pulse signals $\phi 1$ and $\phi 2$, as well as $\phi 1'$ and $\phi 2'$, as illustrated in FIG. 2b, are supplied to the shift registers 203 and 204, so that the switches 211 to 21n and 221 to 22n are sequentially controlled. In order to also assure a horizontal integration in the embodiment illustrated in FIG. 2a, the signals at outputs 201 and 202 can each be fed to an output storage 271 and 272, analogous to the arrangement in accordance with FIG. 1a in a non-interlaced sequence. Analogously, the output storages 271 and 272 are not discharged image point by image point, but here also, for the purpose of increasing the integration period, only during each second image point. For this purpose, the frequency of pulse signals $\phi R$ and $\phi R'$, which are generated by the timing signal generator 205, are divided with the aid of the frequency dividers 208 and 209 as well as AND gates 273 and 274, so that each second impulse is suppressed. In a known manner, the output signals of the output storages 271 and 272 are combined in a circuit 275 to conform to a standard television format.

Figure 3A:
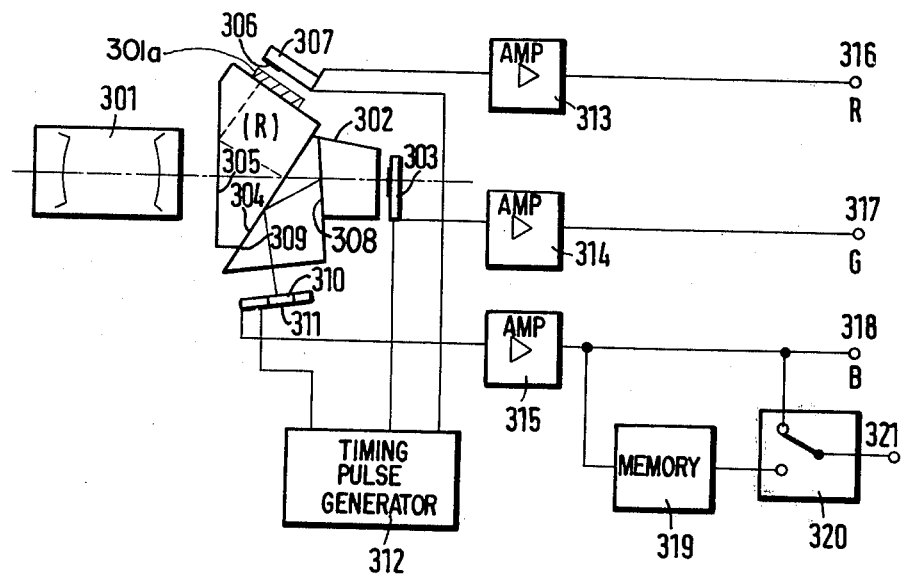
FIG. 3a shows a color television camera provided with CCIDs.

Another embodiment of the invention having utility in a color television camera equipped with CCIDs is schematically illustrated in FIG. 3a wherein only the components necessary for an understanding of the invention are illustrated. Components which are not illustrated, such as, for example, housing, additional electrical circuits and details of construction correspond to the known arrangements and need not be described in greater detail in connection with the invention.

In the arrangement in accordance with FIG. 3a, the light incident rhough the objective 301 is divided into the components green (G), red (R) and blue (B) with the aid of a known beam splitter 302. The green component reaches the photo-sensitive layer of a first CCID 303, while the red component, reflected a first time by a dichroic layer 304 and a second time on surface 305 reaches the light-sensitive surface 306 of a second CCID 307. Since sensitivity in the red spectral range is greater than that in the blue spectral range, an appropriate prefilter 301a is used to dampen the red primary color signal. In a similar manner, the blue component is reflected on layer 308 and on surface 309 and reaches the light-sensitive surface 310 of a third CCID 311. The CCID circuits 303, 307 and 311 are supplied with timed pulse signals with the aid of a timing generator 312. The CCID circuits 303 and 307 are supplied with timed pulses in a conventional manner as it is specified by the producers of the CCID circuits. However, for the purpose of improving the sensitivity and the signal-to-noise ratio in the blue channel, the supply of CCID 311 is carried out in the manner specified in the method in accordance with the invention as described in greater detail in connection with FIGS. 3b and 3e.

For the sake of completeness, amplifiers 313, 314, 315 are provided in FIG. 3a for each of the color value signals produced with the aid of the CCID circuits. Signals R and G can be taken from outputs 316 and 317 of amplifiers 313 and 314. Signal B can be taken from output 318 of amplifier 315. As will be described in greater detail in connection with FIG. 3b, since the signal B is not continuously available in every line at the output of CCID 311, but only, for example, in every second line, a storage device 319 for the signals corresponding to one line, as well as a change-over switch 320 can be provided. The switch 320 can be controlled by a square wave potential with half line frequency, so that, at the output of amplifier 315, the signal B which is present in every second line is repeated once so that a standard signal B is available at output 321. However, this circuit for the repetition of signals is necessary only when this repetition does not already take place in CCID 311, as will be described in connection with FIG. 3b. In addition, in the case of portable mini-camera units typically used in news reporting situations, which typically consist of a small lightweight camera and magnetic recording apparatus, the possibility exists of carrying out the repetition of signal B only in the reproduction of the recorded signals. Consequently, circuits 319 and 320 are not necessarily located in the portable portion of the mini-camera system.

Figure 3B:
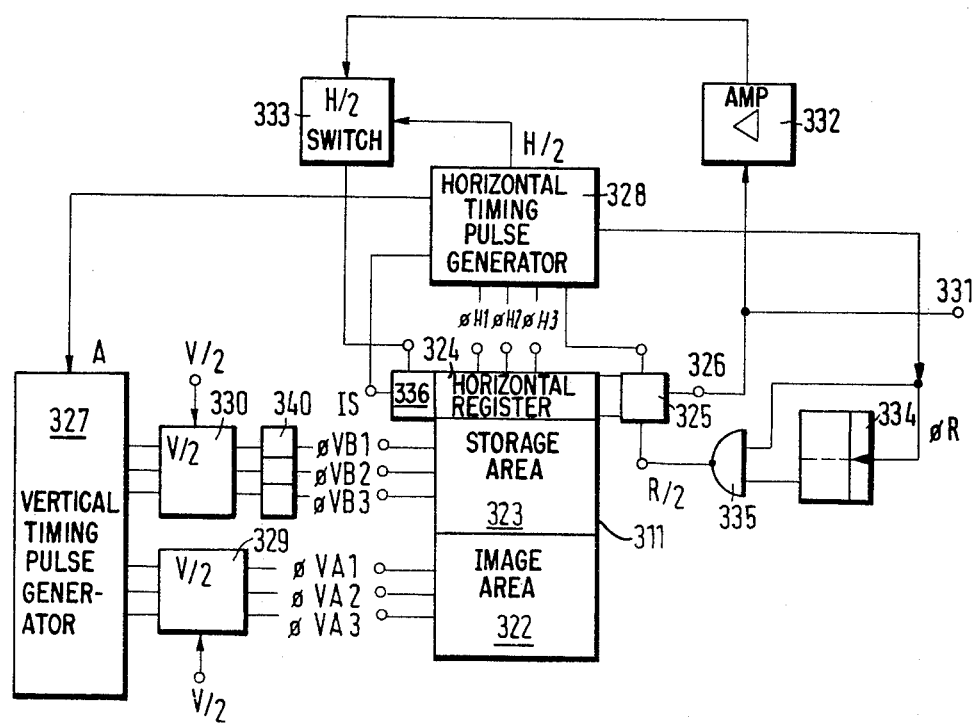

FIG. 3b represents a circuit arrangement comprising the CCID 311 and associated circuitry to operate according to this invention. The CCID 311 comprises a part with a light-sensitive surface, hereinafter called the image area 322 and a further part 323 for the storage of the charges for one image point in the image area, hereinafter called storage area 323. In addition, the CCID 311 also comprises a horizontal register 324 in which the charges of one line can be stored and then shifted into the output circuit 325. The video signals can then be taken from output 326. Timed pulses for shifting the charges from the image area 322 through the storage area 323 to the horizontal register 324 are produced by the vertical timing generator 327, while the pulses for the control of the horizontal register are supplied by a horizontal timing generator 328. Both the function as well as further details of the arrangement in accordance with FIG. 3b are described in connection with the pulse diagrams in accordance with FIGS. 3c, 3d and 3e.

Figure 3C:
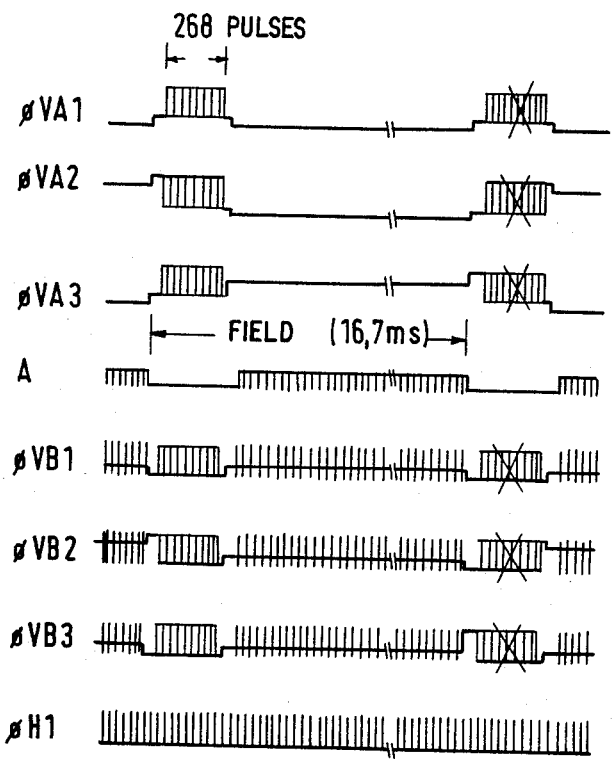
FIGS. 3c, 3d and 3e show the pulse signals in various time scales associated with the embodiment illustrated in FIGS. 3a and 3b.

The charges which are developed by image points through the illumination of image area 322 are transferred from the image area 322 to the storage area 323 with timing pulse signals $\phi$VA1 and $\phi$VA2 and $\phi$VA3 which are schematically illustrated in FIG. 3c. In a practically configured circuit, each of these three impulse series, using the CCID, consists of 268 individual pulses which occur during the vertical frequency scanning interval. During the active time of each image period, the timed impulse series $\phi$VB1, $\phi$VB2 and $\phi$VB3 are supplied to the CCID 311, consisting of horizontal frequency impulses. For the purpose of synchronization, a scanning impulse mixture A is supplied to generator 327 by generator 328.

Finally, a further impulse series is illustrated in FIG. 3c, namely $\phi$H1. As for the phase-shifted impulses $\phi$H2 and $\phi$H3, this impulse series also serves to shift the charges through the horizontal register 324 and is produced in generator 328.

Figure 3E:
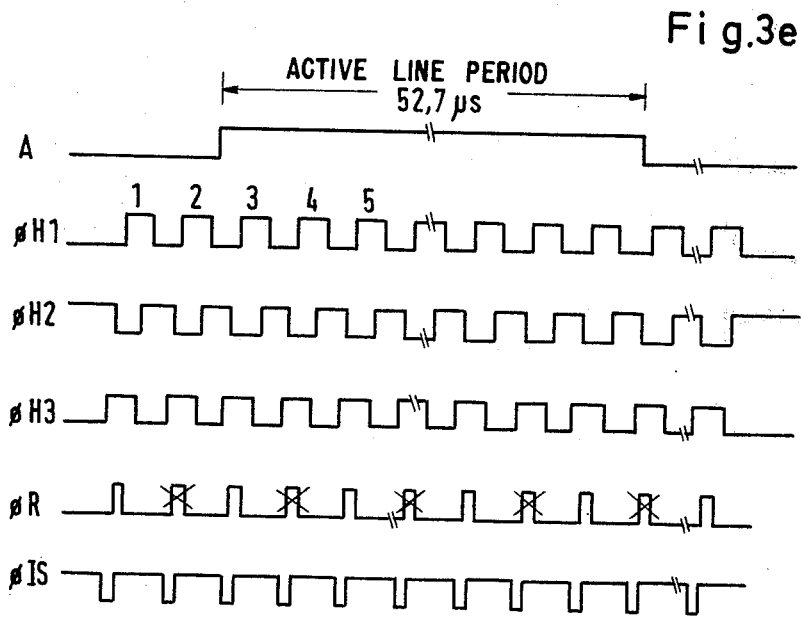
Figure 3D:
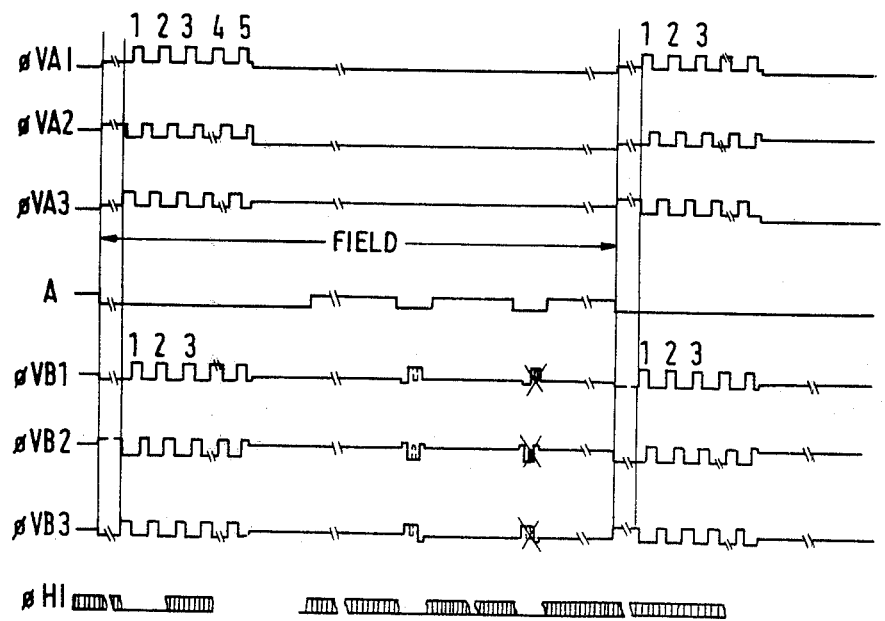

The same timing pulse series as in FIG. 3c are illustrated in FIG. 3d, but, to make it possible to illustrate the individual pulses better, a changed time scale was selected. It can thus be seen, for example, that the timed pulse series $\phi$VA1 to $\phi$VA3 consists of groups of 268 individual pulses occurring with vertical frequency and that the timed pulse series $\phi$VB1 to $\phi$VB3, in addition to 268 pulses within the vertical frequency scanning interval, evidences one pulse within the horizontal frequency scanning interval. This additional pulse transfers the information belonging to one line from the storage area 323 into the horizontal register 324. During this time, pulses $\phi$H, which serve to shift the charge within horizontal register 324, are interrupted.

Pulses $\phi$H1 have such a high frequency that they are simply illustrated as a band in FIG. 3d. The time scale is again increased in FIG. 3e, so that pulses $\phi$H1 to $\phi$H3 can be recognized as such. Pulses $\phi$R, which discharge the output circuit 325 and thus prepare it for the recording of a new charge corresponding to an image point, are derived from impulses $\phi$H. They are illustrated in FIG. 3e in the line designated with $\phi$R.

The method in accordance with the invention can now be applied to a CCID by applying the following measures individually or in combination:

prolonging of the integration period of one image period to two or possibly more;

integration of the charges of two superposed image points of two or more sequential lines; and/or integration of the charges of two or more sequential image points within a line. The first measure can be carried out by inserting a V/2 switch 329 in the supply lines for timing pulses $\phi$VA1 to $\phi$VA3 between the timing generator 327 and the CCID 311. This V/2 switch 329 can be controlled by a square wave potential with a half image frequency so that every second pulse series of the pulses $\phi$VA1 to $\phi$VA3 is interrupted as symbolically illustrated in FIG. 3c. The same measure must then be provided in the supply lines for pulses φVB1 to φVB3. A CCID operated in such a manner would then not provide a signal during each second half image. However, by means of a half-image storage, which is not illustrated in FIG. 3b, the signal of a field could be repeated, so that standard television signals would again be available.

In the implementation of the second above mentioned measure, for the purpose of the integration or combination of the charges of vertically adjacent image points, the timed pulses φVB1 to φVB3 are changed to combine charges generated over a prolonged period of time, as illustrated in FIG. 3d. Namely, of the impulses from φVB1 to φVB3 occurring during the active image duration, every second pulse is suppressed and the remaining pulses are replaced by two pulses which follow each other in short sequence. Thus, at the beginning of a first line period the charges of two lines are rapidly sequentially transferred from storage area 323 into the horizontal register 324. By means of the pulses φH which follow this double pulse, the charges corresponding to the image points of two adjacent lines are then moved from the horizontal register 324, through output circuit 325, to output 331, where they can be taken off for further amplification. At the same time, these signals are fed to the input 336 of the horizontal register through an amplifier 332 and a switch 333. During the following line period, the lines having thus again been written into the horizontal register 324 again be read out. During this second read out switch 333 is open so as to prevent the reintroduction of the output signals into the input 336. At the beginning of the next line period, a double pulse again occurs within the timed pulse series φVB so that the charges belonging to two lines are written from the storage area 323 into the horizontal register 324.

Finally, the charges of two adjacently located image points can be integrated analogously to the embodiments illustrated in FIGS. 1 and 2 to implement the third above mentioned possibility. Of the timed impulses φR which control the output circuit 325, every second one is suppressed, again being carried out with a frequency divider 334 and an AND gate 335.

For the suppression of every second impulse of timing φVB, occurring during the active image period, as well as for the transformation of the remaining impulses into double impulses, a circuit 340 is inserted in each supply line for these timed signals from the generator 327 to the storage area 323. An example of such a circuit is illustrated in FIG. 4.

Figure 4:
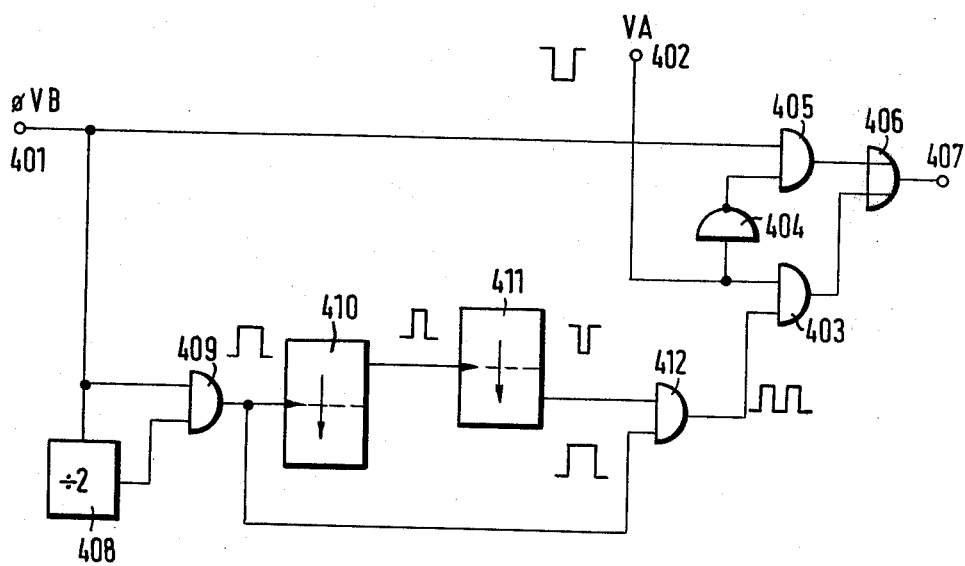
FIG. 4 shows a circuit for the modification of pulse signals which occur in the circuit arrangement in accordance with FIG. 3b.

The particular timing signal φVB1, 2 or 3 is supplied to the circuit in accordance with FIG. 4 at 401. In addition, the circuit in accordance with FIG. 4 obtains a vertical frequency scanning signal VA. This is directly supplied to the input of the AND gate 403 and, following a negation with the aid of gate 404, to an input of the AND circuit 405. The outputs of the AND circuits 403 and 405 are each connected to an input of the OR circuit 406, of which the output represents the output 407 of the circuit arrangement in accordance with FIG. 4, and to which the timing signals φVB, which are to be modified for the purpose of carrying out the method in accordance with the invention, are applied. During the vertical frequency scanning interval, the supply of the vertical frequency scanning signal VA to the AND circuit 403 moves the input signal φVB directly to the output so that the 268 impulses which occur during the vertical frequency scanning interval reach output 407 unchanged. During the active image period, the AND circuit 403 is opened so that the timing signals, which are modified in the manner described below, reach output 407.

The timing signals φVB are initially fed into a frequency divider 408 and an input of an AND circuit 409. The output of the frequency divider 408 is connected with the other input of AND circuit 409, so that—as already described several times—a suppression of every second impulse results. A monostable multivibrator 410, of which the time constant corresponds approximately to one third of the width of the timing impulses, is controlled by means of the leading edges of the remaining impulses. With their trailing edge, a second monostable multivibrator 411 is again controlled whose inverted output is an impulse of which the width again corresponds to about one third of the impulse width of the input signal and which occurs in the middle of the input signal. The desired double impulse is generated by the combination of these impulses in an AND circuit 412. During the active image period, this is then fed from the AND circuit 403 and the OR circuit 406 to the output 407.

The application of the methods in accordance with this invention in a color television camera was described on the basis of the use of the RCA CCID SID 51232. The method in accordance with this invention can of course also be applied with other CCIDs. Thus, for example, in view of the above mentioned special CCID, the description of the arrangement in accordance with FIG. 3 is based on the so-called three-phase pulse input which results from the special configuration of the CCID. Other CCIDs require a two-phase or even a four-phase timing to which the invention can be easily adapted by those skilled in the art. Furthermore, the application of the method in accordance with the invention is also possible in systems in which a common opto-electronic converter is provided for the red and for the blue primary color signals (for example banded filter cameras). However, because the sensitivity in the red spectral range is too great in comparison with the blue, it is recommended the red primary color signal be dampened with an appropriate prefilter. Although the invention has been described in considerable detail with reference to certain preferred embodiments thereof, it will be understood that variations and modifications can be effected within the spirit and scope of the invention as described above and as defined in the appended claims.

What is claimed is:

1. In the color television imaging method in which several primary color signals are formed with the use of at least two sets of opto-electronic converters by combining within sequential scanning intervals the charges which develop in proportion to the quantity of light incident upon the converters, the improvement comprising the steps of:

combining the charges forming the blue primary color signal over a greater time-space metric than with the other primary colors providing a common opto-electronic converter for the red and blue primary color signals, and dampening the red primary color signal with an appropriate filter.

2. In the color television imaging method in which several primary color signals are formed with the use of at least two sets of opto-electronic converters by combining, within sequential scanning intervals the charges which develop in proportion to the quantity of light incident upon the converters, the improvement comprising the steps of:

providing a plurality of row-shaped opto-electronic converters, one row-shaped converter providing charges for each primary color signal desired, periodically scanning each row-shaped converter to detect the charges and thereby develop each primary color signal from the charges, and combining the blue primary color charges over a time period greater than the scanning period for the other primary color signals.

3. The color television imaging method of claim 2 further comprising the steps of scanning the row-shaped converters in a non-interlaced scanning sequence, and storing the signals produced for later transformation to an appropriate format.

4. The color television imaging method of claim 2 further comprising the step of interpolating the scanned signal with a subsequently developed signal.

5. In the color television imaging method in which several primary color signals are formed with the use of at least two sets of opto-electronic converters by combining the charges which develop in proportion to the quantity of light incident upon the converters, the improvement comprising the step of interrupting periodically the reading timing pulses provided for the blue primary color opto-electronic converter.

6. In the color television imaging method in which several primary color signals are formed with the use of at least two sets of opto-electronic converters by combining, within sequential scanning intervals, the charges which develop in proportion to the quantity of light incident upon the converters, the improvement comprising the steps of providing a plurality of opto-electronic converter matrices, each matrix having an image area, an intermediate storage area and a horizontal register, and suppressing periodically the normal timing pulse group serving to shift the light quantity related charges from the image area to the intermediate storage area in one matrix.

7. In the color television imaging method in which several primary color signals are formed with the use of at least two sets of opto-electronic converters by combining, within sequential scanning intervals, the charges which develop in proportion to the quantity of light incident upon the converters, the improvement comprising the steps of providing a plurality of opto-electronic converter matrices, each matrix having an image area, an intermediate storage area and a horizontal register, suppressing the normal timing pulses serving to shift the light quantity related charges from the intermediate storage area into the horizontal register in one matrix and replacing every other of said normal timing pulses with a short sequence double pulse.

8. The color television imaging method of claim 7 further comprising the step of reintroducing the output signal of the horizontal register into an input of the horizontal through a half-line frequency controlled switch.

9. In the color television imaging method in which several primary color signals are formed with the use of at least two sets of opto-electronic converters by combining, within sequential scanning intervals, the charges which develop in proportion to the quantity of light incident upon the converters, the improvement comprising the steps of providing a plurality of opto-electronic converter matrices, each matrix having an image area, an intermediate storage area, and a horizontal register and periodically suppressing the normal timing pulses serving to output the signal stored in the horizontal register.

10. In the color television imaging method in which several primary color signals are formed with the use of at least two sets of opto-electronic converters by combining, within sequential scanning intervals, the charges which develop in proportion to the quantity of light incident upon the converters, the improvement comprising the steps of recording the signal corresponding to at least the blue primary color signal and reproducing the recorded signal such that every second line or image of the blue primary color signal is repeated.

11. A color television imaging apparatus comprising at least two opto-electronic converters for converting the quantity of light incident thereon into a charge proportional thereto wherein said opto-electronic converters are row-shaped converters continuously moveable with respect to a subject film, the converters being adjustable at least in the direction of subject film motion; means for sequentially scanning each of the sets of charges developed in the converters to produce a plurality of color signals, and means for combining the charges forming the blue primary color signal over a time-space metric thereby enhancing the blue primary color signal.

12. In a color television imaging apparatus comprising at least two opto-electronic converters for converting the quantity of light incident thereto into a charge proportional thereto and means for sequentially scanning each of the sets of charges developed in the converters to produce a plurality of color signals, the improvement comprising means for periodically suppressing the normal timing pulses regulating the scanning means for the blue primary color signal.

13. In a color television imaging apparatus comprising at least two opto-electronic converters for converting the quantity of light incident thereon into a charge proportional thereto and means for sequentially scanning each of the sets of charges developed in the converters to produce a plurality of color signals, the improvement comprising means for suppressing the normal timing pulses regulating the scanning means for the blue primary color signal and means for replacing alternate ones of the normal timing pulses with short-sequenced double pulses.

14. A color television imaging apparatus comprising:

at least two opto-electronic converters including a blue primary color converter for converting the quantity of light incident thereon into charges proportional thereto wherein the opto-electronic converters each comprise a matrix array, an intermediate storage register, and a horizontal register;

means for sequentially scanning each of the sets of charges developed in the converters to produce a plurality of color signals, and means for combining the charges forming the blue primary color signal over a time-space metric thereby enhancing the blue primary color signal wherein the charge combining means includes means connected to the blue primary color converter for selectively reintroducing the output of the horizontal register into an input of the horizontal register.

15. In a color television imaging method in which several primary color signals are formed with the use of at least two sets of opto-electronic converters, one of which is a blue primary color opto-electronic converter, for integrating charges which develop in the converters in proportion to the quantity of light incident upon the converters, the improvement comprising the step of: integrating the blue primary color signal over a time interval which is a multiple of the field period.

16. In a color television imaging method in which several primary color signals are formed with the use of at least two sets of opto-electronic converters, one of which is a blue primary color opto-electronic converter, and the other of which is another primary color opto-electronic converter, by combining the charges which develop in proportion to the quantity of light incident upon the converters, the improvement comprising: applying timing pulses to the blue primary color opto-electronic converter at a rate different than the rate timing pulses are applied to the at least one other opto-electronic converter to enhance the blue color signal.

* * * * *